(12) United States Patent
Kuehner et al.

(10) Patent No.: US 10,589,414 B2
(45) Date of Patent: Mar. 17, 2020

(54) HANDHELD POWER TOOL INCLUDING AN OSCILLATING EXCITATION ACTUATOR

(71) Applicant: Robert Bosch GmbH, Stuttgart (DE)

(72) Inventors: Jochen Kuehner, Backnang (DE); Klaus Kuhnen, Saarbrücken (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/305,295

(22) PCT Filed: May 8, 2017

(86) PCT No.: PCT/EP2017/060897
§ 371 (c)(1),
(2) Date: Nov. 28, 2018

(87) PCT Pub. No.: WO2017/207222
PCT Pub. Date: Dec. 7, 2017

(65) Prior Publication Data
US 2019/0337139 A1    Nov. 7, 2019

(30) Foreign Application Priority Data

Jun. 2, 2016    (DE) ........................ 10 2016 209 673

(51) Int. Cl.
*B25F 5/02*    (2006.01)
*B23B 37/00*    (2006.01)

(52) U.S. Cl.
CPC ................ *B25F 5/02* (2013.01); *B23B 37/00* (2013.01)

(58) Field of Classification Search
CPC .................................. B25F 5/02; B23B 37/00

USPC ............................................................ 173/1
See application file for complete search history.

(56) References Cited

FOREIGN PATENT DOCUMENTS

| DE | 102011078452 A1 | 1/2013 |
|---|---|---|
| DE | 102013222046 A1 | 4/2015 |
| DE | 102014220225 A1 | 4/2016 |

OTHER PUBLICATIONS

International Search Report for PCT/EP2017/060897, dated Sep. 27, 2017.

*Primary Examiner* — Michelle Lopez
(74) *Attorney, Agent, or Firm* — Norton Rose Fulbright US LLP; Gerard Messina

(57) ABSTRACT

A handheld power tool including at least one drive unit, includes at least one oscillating excitation actuator for the oscillating drive of an associated insertion tool and includes an electronics unit for the controlled energy supply of the drive unit, the electronics unit including at least one inverter, one transformer, and one measuring circuit, the inverter being configured to generate a primary-side transformer voltage and a primary-side transformer current of the transformer, the transformer being configured to transform the primary-side transformer voltage and the primary-side transformer current into an application-specific supply voltage and a supply current for the drive unit, and a controller being associated with the measuring circuit, which is configured to generate at least one control signal for the inverter from a predefined setpoint value and a measured value detected by the measuring circuit, the measuring circuit is situated between the inverter and the transformer.

11 Claims, 3 Drawing Sheets

HANDHELD POWER TOOL INCLUDING AN OSCILLATING EXCITATION ACTUATOR

FIELD OF THE INVENTION

The present invention relates to a handheld power tool including at least one drive unit, which includes at least one oscillating excitation actuator for the oscillating drive of an associated insertion tool, and is provided with an electronics unit for the controlled energy supply of the drive unit, the electronics unit including at least one inverter, one transformer, and one measuring circuit, the inverter being configured to generate a primary-side transformer voltage and a primary-side transformer current of the transformer, the transformer being configured to transform the primary-side transformer voltage and the primary-side transformer current into an application-specific supply voltage and a supply current for the drive unit, and a controller being associated with the measuring circuit, which is configured to generate at least one control signal for the inverter from a predefined setpoint value and a measured value detected by the measuring circuit.

BACKGROUND INFORMATION

Such a handheld power tool, configured as an ultrasonic oscillator, including a drive unit for the oscillating drive of an associated insertion tool is known from the related art. The drive unit includes an oscillating excitation actuator. Furthermore, the power tool is provided with an electronics unit for the controlled energy supply of the drive unit. The electronics unit includes an inverter, a transformer, and a measuring circuit. The inverter is configured to generate a primary-side transformer voltage and a primary-side transformer current of the transformer. The transformer is configured to transform the primary-side transformer voltage and the primary-side transformer current into an application-specific supply voltage and a supply current for the drive unit. In addition, a controller is associated with the measuring circuit, which is configured to generate at least one control signal for the inverter from a predefined setpoint value and the measured value detected by the measuring circuit. The measuring circuit is situated on the secondary side in relation to the transformer, an energy transmission for the drive unit taking place on the secondary side via friction rings.

SUMMARY OF THE INVENTION

The present invention provides a novel handheld power tool including at least one drive unit, which includes at least one oscillating actuator for the oscillating drive of an associated insertion tool, and is provided with an electronics unit for the controlled energy supply of the drive unit, the electronics unit including at least one inverter, one transformer, and one measuring circuit, the inverter being configured to generate a primary-side transformer voltage and a primary-side transformer current of the transformer, the transformer being configured to transform the primary-side transformer voltage and the primary-side transformer current into an application-specific supply voltage and a supply current for the drive unit, and a controller being associated with the measuring circuit, which is configured to generate at least one control signal for the inverter from a predefined setpoint value and a measured value detected by the measuring circuit. The measuring circuit may be situated between the inverter and the transformer.

The present invention thus enables the provision of a handheld power tool, in which a contactless energy transmission for the drive unit may take place due to the arrangement of the measuring circuit between the inverter and the transformer. A provision of a safe and reliable drive unit may thus be enabled, a wear-related failure of the handheld power tool being able to be at least nearly avoided.

The measuring circuit may be configured for the primary-side measurement of the transformer voltage and the transformer current. A stabilization of the at least one oscillating excitation actuator may thus be enabled in a simple manner.

The controller may be configured to generate the at least one control signal for the inverter from a predefined phase setpoint value and a measured value detected by the measuring circuit. A secure and reliable generation of the at least one control signal may thus be enabled.

According to one specific embodiment, the transformer is configured for contactless energy transmission. Simple and wear-free energy transmission may thus be enabled.

The transformer may be configured as a rotary transformer. A robust and stable transformer may thus be provided.

A phase zero crossing of a terminal impedance of the drive unit and a phase zero crossing of a transformer input impedance of the transformer may be associated with a predefined operating frequency within predefined tolerances. A simple and uncomplicated regulation of the drive unit via the phase zero crossing of the transformer input impedance of the transformer may thus be enabled.

According to one specific embodiment, a transformer input impedance phase associated with the transformer input impedance is predefined as regulating information for a phase regulation of the drive unit. A primary-side regulation of the drive unit may thus be enabled.

The controller may be configured as a digital controller. A reliable controller insensitive to interference may thus be provided.

A power filter may be situated between the transformer and the drive unit. A low-harmonic activation voltage of the drive unit and/or a low-harmonic activation current of the drive unit may thus be provided.

According to one specific embodiment, the power tool is configured as an ultrasonic drill. A suitable handheld power tool may thus be provided in a simple and uncomplicated manner.

Furthermore, the present invention provides a novel method for operating a handheld power tool including at least one drive unit, which includes at least one oscillating excitation actuator for the oscillating drive of an associated insertion tool, and is provided with an electronics unit for the controlled energy supply of the drive unit, the electronics unit including at least one inverter, one transformer, and one measuring circuit, the inverter being configured to generate a primary-side transformer voltage and a primary-side transformer current of the transformer, the transformer being configured to transform the primary-side transformer voltage and the primary-side transformer current into an application-specific supply voltage and a supply current for the drive unit, and a controller being associated with the measuring circuit, which is configured to generate at least one control signal for the inverter from a predefined setpoint value and a measured value detected by the measuring circuit. The measuring circuit may be situated between the inverter and the transformer and carries out a primary-side measurement of the transformer voltage and the transformer current of the transformer.

The present invention is explained in greater detail in the following description on the basis of exemplary embodiments shown in the drawings.

DETAILED DESCRIPTION

Figure 1:
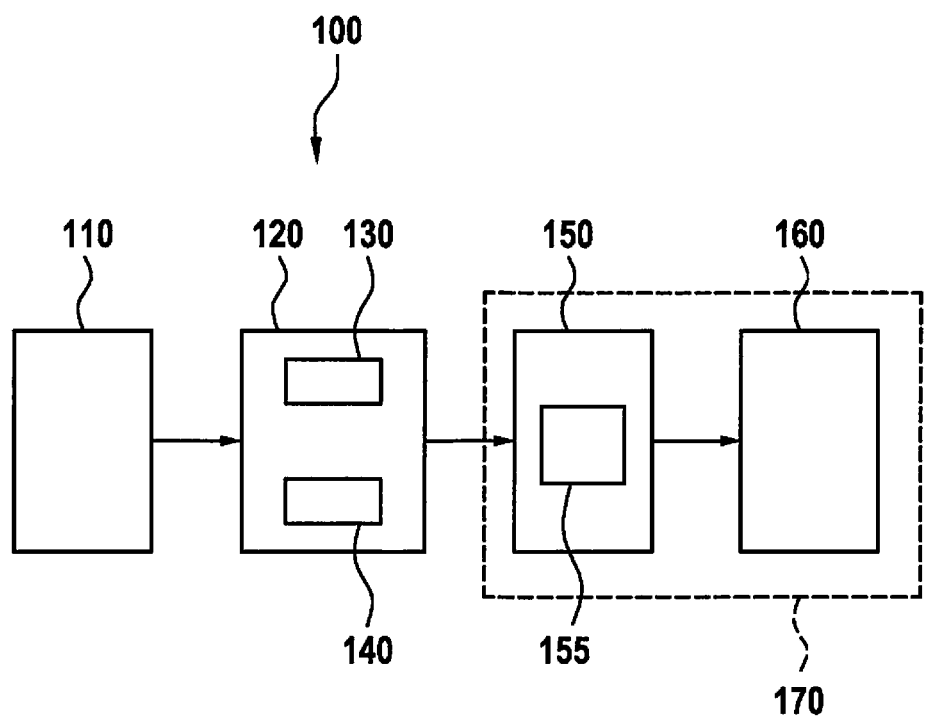
FIG. 1 shows a schematic view of a handheld power tool including an electronics unit and a drive unit.

FIG. 1 schematically shows a handheld power tool 100 according to the present invention, which may be configured as a piezoelectrically operated ultrasonic oscillating system. Handheld power tool 100 is provided with at least one electronics unit 120 for the controlled energy supply of a drive unit 150, which is configured for the oscillating drive of an associated insertion tool 160 and may include at least one oscillating excitation actuator 155 for this purpose. Drive unit 150 may form a load 170 with excitation actuator 155 and insertion tool 160.

Electronics unit 120 may be supplied by an energy source 110, which is configured as mains-independent having a battery pack by way of example. However, energy source 110 could also be configured as mains-dependent. Furthermore, a controller 140 and/or a power and analog electronics unit 130 is associated with electronics unit 120, which is described in greater detail in FIG. 2.

Handheld power tool 100 may be configured as an ultrasonic drill, in which an ultrasonic oscillation may be overlaid with a rotational movement. For this purpose, drive unit 150 may, for example, include disk-shaped piezoceramics for forming oscillating excitation actuator 155. Alternatively thereto, handheld power tool 100 may also be configured, for example, as a cutting device, in particular a piezo knife or cutter, for cutting different materials, in which insertion tool 160 is formed by a cutting tool, in particular a blade. However, it is to be noted that the present invention is not restricted to such ultrasonic drills and/or piezo knives or cutters, but rather may be used in any arbitrary ultrasonic oscillating systems.

Figure 2:
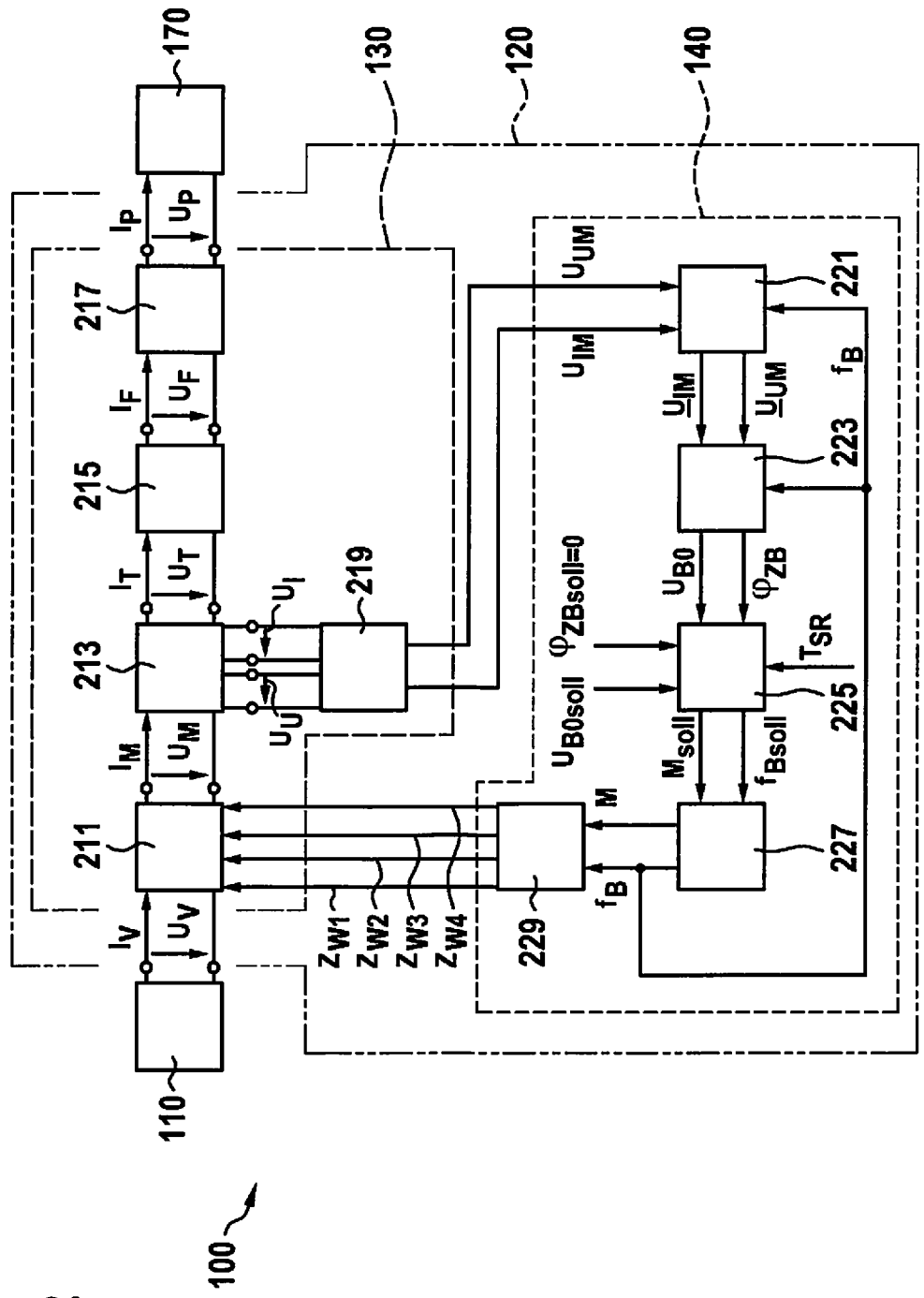
FIG. 2 shows a schematic view of the handheld power tool from FIG. 1 including the electronics unit, which includes a controller and a power and analog electronics unit.

FIG. 2 shows power tool 100 from FIG. 1 and illustrates its electronics unit 120. This electronics unit 120 includes, as described above, a controller 140 and a power and analog electronics unit 130. Electronics unit 120 may be configured for anti-resonance frequency operation, but could also be configured for resonance frequency operation.

Power and analog electronics unit 130 may be configured as a resonance converter, which is used to keep drive unit 150 stable and robust, i.e., at least largely independent of changing surroundings and load conditions, and to operate it with low loss in its anti-resonance point at a predefined oscillation amplitude. However, other types of resonance converters may also be used depending on a particular selected specific embodiment.

According to one specific embodiment, power and analog electronics unit 130 includes at least one inverter 211, with which at least one pulse signal generator 229 may be associated. Power and analog electronics unit 130 may include inverter 211, a measuring circuit 213, a transformer 215, a power filter 217, and/or a signal electronics unit 219.

Pulse signal generator 229 may be configured to provide control signals $Z_{w1}$, $Z_{w2}$, $Z_{w3}$, $Z_{w4}$ for inverter 211 to enable a generation of an application-specific supply voltage $U_P$ for drive unit 150 and load 170 on the basis of these control signals $Z_{w1}$, $Z_{w2}$, $Z_{w3}$, $Z_{w4}$. Inverter 211 may convert a supply voltage $U_V$ provided by energy source 110 into a pulsed voltage $U_T$ as a function of control signals $Z_{w1}$, $Z_{w2}$, $Z_{w3}$, $Z_{w4}$. This pulsed voltage may have the form of voltage pulses, i.e., the form of a pulse-width-modulated voltage signal, whose voltage-time area is proportional to an amplitude of a fundamental wave of supply voltage $U_P$ in the voltage-time signal.

Inverter 211 may be configured for generating a primary-side transformer voltage $U_T$ and a primary-side transformer current $I_T$ of transformer 215. Primary-side transformer voltage $U_T$ and primary-side transformer current $I_T$ may be derived in this case from a supply current $I_V$, which is provided by energy source 110.

Transformer 215 may be configured for contactless energy transmission, which may be as a rotary transformer. Transformer 215 may be configured to transform primary-side transformer voltage $U_T$ and primary-side transformer current $I_T$ into application-specific supply voltage $U_P$ and a supply current $I_P$ for drive unit 150 and for load 170.

Transformer 215 may transform comparatively low primary-side transformer voltage $U_T$ and comparatively high primary-side transformer current $I_T$ into a comparatively high output voltage $U_F$ and a comparatively low output current $I_F$ and supplies them to power filter 217. This filter has the task of damping harmonic waves generated in inverter 211 in transformer voltage $U_T$ and transformer current $I_T$, or output voltage $U_F$ and output current $I_F$, respectively. Therefore, an at least largely low-harmonic supply voltage $U_P$ and what may be a low-harmonic supply current $I_P$ may be generated. Power filter 217 may be situated between transformer 215 and drive unit 150 and load 170.

Measuring circuit 213 may be situated between inverter 211 and transformer 215. Measuring circuit 213 may be used for the at least essentially low-loss simultaneous measurement of activation voltage $U_M$ and activation current $I_M$, to supply them as supply voltage $U_P$ and supply current $I_P$ to drive unit 150 and load 170. Measuring circuit 213 may be configured for the primary-side measurement of transformer voltage $U_T$ and transformer current $I_T$. For this purpose, measuring circuit 213 generates a measuring voltage $U_U$ for activation voltage $U_M$ and a measuring voltage $U_I$ for activation current $I_M$, which are supplied to signal electronics unit 219 and are processed thereby at least essentially without loss and converted on the output side into filtered measuring voltages $U_{UM}$ and $U_{IM}$. Signal electronics unit 219 may be configured as a potential-separating signal electronics unit.

Signal electronics unit 219 supplies filtered measuring voltages $U_{UM}$ and $U_{IM}$ to controller 140. Controller 140, which may be configured as a digital controller, is associated with measuring circuit 213 and may be configured to generate at least one control signal $Z_{w1}$, $Z_{w2}$, $Z_{w3}$, $Z_{w4}$ for inverter 211 from a predefined setpoint value, which may be from a predefined phase setpoint value $\varphi_{ZBsetpoint}$ and a measured value $U_U$, $U_I$ detected by measuring circuit 213.

Digital controller 140 may be associated with a signal processing unit 221, a measured value correction unit 223, a regulator 225, a manipulated variable quantification unit 227, and/or a pulse signal generator 229. By way of illustration, which may be analog signal electronics unit 219 supplies filtered measuring voltages $U_{UM}$ and $U_{IM}$ to digital signal processing unit 221. Filtered measuring voltages $U_{UM}$ and $U_{IM}$ may be converted in digital signal processing unit 221 on the basis of an operating frequency $f_B$ of electronics unit 120 into measuring voltages $\underline{U}_{UM}$ and $\underline{U}_{IM}$.

Measuring voltages $\underline{U}_{UM}$ and $\underline{U}_{IM}$ are conducted to digital measured value correction unit 223. Measured value correction unit 223 may be configured to effectuate a compensation of the transmission behavior of analog signal electronics unit 219 in the fundamental wave on the basis of operating frequency $f_B$. However, measured value correction unit 223 may also be omitted depending on a particular selected design of electronics unit 120.

An amplitude $U_{B0}$ and a corresponding phase $\varphi_{ZB}$ of the anti-resonance impedance provided by measured value correction unit 223 are compared in digital regulator 225 to setpoint values $U_{B0setpoint}$ and $\varphi_{ZBsetpoint}$ for phase $\varphi_{ZB}$ to ascertain a degree of modulation setpoint value $M_{setpoint}$ and a particular operating frequency $f_{Bsetpoint}$ to be predefined. By way of illustration, digital controller 225 also processes a temperature signal $T_{SR}$.

Degree of modulation setpoint value $M_{setpoint}$ and operating frequency $f_{Bsetpoint}$ are subsequently relayed to manipulated variable quantification unit 227. Manipulated variable quantification unit 227 describes quantification effects in manipulated variables of pulse signal generator 229 on the basis of the finite time resolution and numeric representation of a digital controller 140 formed at least by signal processing unit 221, measured value correction unit 223, regulator 225, and manipulated variable quantification unit 227. For this purpose, manipulated variable quantification unit 227 may determine operating frequency $f_B$ and a degree of modulation M for pulse signal generator 229 on the basis of degree of modulation setpoint value $M_{setpoint}$ and a particular operating frequency $f_{Bsetpoint}$ to be predefined. Digital controller 140 may be implemented with the aid of a microcontroller. Manipulated variable quantification unit 227 may be omitted in this case depending on a selected technical implementation.

Digital pulse signal generator 229 may activate four switching transistors of inverter 211 via control signals $Z_{w1}$, $Z_{w2}$, $Z_{w3}$, $Z_{w4}$, in such a way that pulsed primary-side transformer voltage $U_T$ may be generated thereby as described above using voltage pulses. As a function of the selected number of the switching transistors of inverter 211, digital pulse signal generator 229 has more or fewer control signals $Z_{w1}$, $Z_{w2}$, $Z_{w3}$, $Z_{w4}$ in this case. In the case of a predefined number of more than two support points per period of pulsed transformer voltage $U_T$, the signal processing carried out by controller 140 requires an exact detection of a signal period, in such a way a sampling frequency is to be coupled to operating frequency $f_B$. Controller 140 therefore has a variable sampling rate, which is adapted to operating frequency $f_B$. For this purpose, operating frequency $f_B$ may be supplied both to digital signal processing unit 221 and to measured value correction unit 223 as a control value by manipulated variable quantification unit 227.

In addition, in a method for operating handheld power tool 100, a primary-side measurement of transformer voltage $U_T$ and transformer current $I_T$ of transformer 215 may be carried out, i.e., measuring circuit 213 is situated upstream from transformer 215, as described above. Transformer 215, which may be configured as a rotary transformer, may therefore carry out a contactless energy transmission and may therefore be used for ultrasonic drilling.

Figure 3:
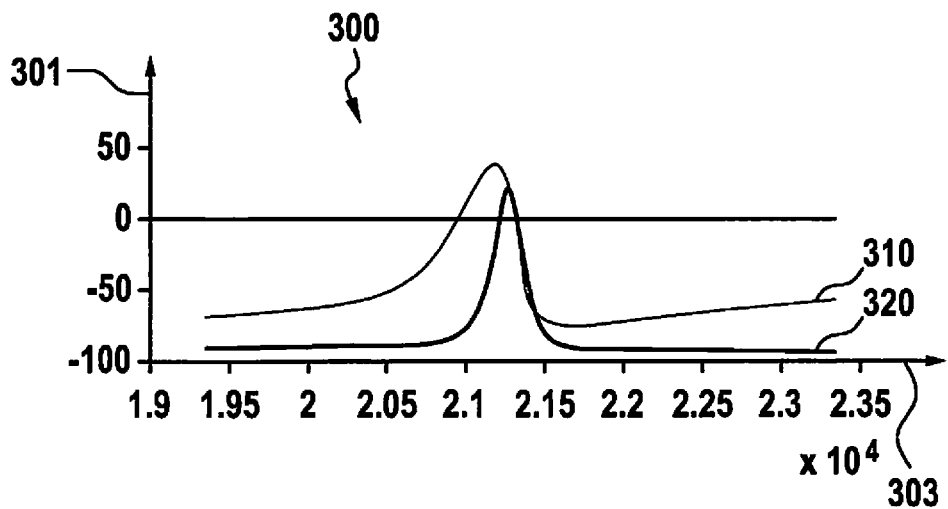
FIG. 3 shows a diagram of an exemplary terminal impedance and a transformer input impedance in the power tool from FIG. 1.

FIG. 3 shows an exemplary diagram 300, which includes a transformer input impedance curve 310 and a terminal impedance curve 320 by way of illustration. Operating frequency $f_B$ in Hz is plotted on an abscissa 303 and a phase Z in degrees is plotted on an ordinate 301. Transformer input impedance curve 310 illustrates a phase zero crossing of a transformer input impedance $Z_T$ of transformer 215 and terminal impedance curve 320 illustrates a phase zero crossing of a terminal impedance $Z_P$ of drive unit 150. The two phase zero crossings are associated with a predefined operating frequency $f_B$ within predefined tolerances by way of illustration. A transformer input impedance phase associated with transformer input impedance $Z_T$ may thus be used as regulating information for a phase regulation of drive unit 150. The transformer input impedance phase may be predefined as regulating information for a phase regulation of drive unit 150.

Figure 4:
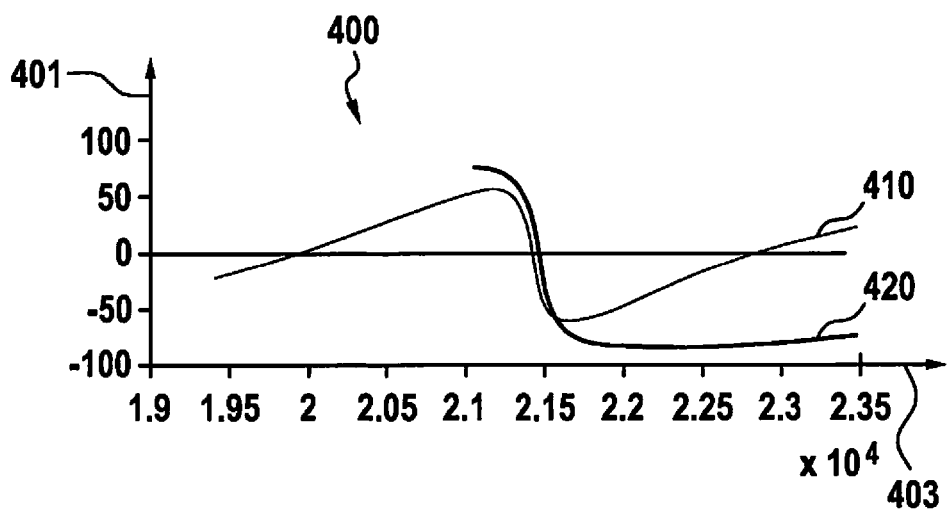
FIG. 4 shows a diagram of an exemplary corrected terminal impedance and a corrected transformer input impedance in the power tool from FIG. 1.

FIG. 4 shows an exemplary diagram 400, which includes a transformer anti-resonance impedance curve 410 and an anti-resonance impedance curve 420 by way of illustration. Operating frequency $f_B$ in Hz is plotted on an abscissa 403 and a phase Z in degrees is plotted on an ordinate 401. Transformer anti-resonance impedance curve 410 illustrates a phase zero crossing of a corrected transformer anti-resonance impedance $Z_B$ of transformer 215 and anti-resonance impedance curve 420 illustrates a phase zero crossing of a corrected anti-resonance impedance $Z_A$ of drive unit 150. The two phase zero crossings are associated with a predefined operating frequency $f_B$ within predefined tolerances by way of illustration, similarly to FIG. 3.

What is claimed is:

1. A handheld power tool, comprising:
   at least one drive unit, which includes at least one oscillating excitation actuator for the oscillating drive of an associated insertion tool;
   an electronics unit for providing a controlled energy supply of the drive unit, the electronics unit including at least one inverter, one transformer, one measuring circuit, and a controller associated with the measuring circuit;
   wherein the inverter is configured to generate a primary-side transformer voltage and a primary-side transformer current of the transformer,
   wherein the transformer is configured to transform the primary-side transformer voltage and the primary-side transformer current into an application-specific supply voltage and a supply current for the drive unit
   wherein the controller, which is associated with the measuring circuit, is configured to generate at least one control signal for the inverter from a predefined setpoint value and a measured value detected by the measuring circuit, and
   wherein the measuring circuit is situated between the inverter and the transformer.

2. The power tool of claim 1, wherein the measuring circuit is configured for the primary-side measurement of the transformer voltage and the transformer current.

3. The power tool of claim 1, wherein the controller is configured to generate the at least one control signal for the inverter from a predefined phase setpoint value and a measured value detected by the measuring circuit.

4. The power tool of claim 1, wherein the transformer is configured for contactless energy transmission.

5. The power tool of claim 4, wherein the transformer is configured as a rotary transformer.

6. The power tool of claim 1, wherein a phase zero crossing of a terminal impedance of the drive unit and a phase zero crossing of a transformer input impedance of the transformer are associated with a predefined operating frequency within predefined tolerances.

7. The power tool of claim 6, wherein a transformer input impedance phase associated with the transformer input impedance is predefined as regulating information for a phase regulation of the drive unit.

8. The power tool of claim 1, wherein the controller is configured as a digital controller.

9. The power tool of claim 1, wherein a power filter is situated between the transformer and the drive unit.

10. The power tool of claim 1, wherein the power tool is configured as an ultrasonic drill.

11. A method for operating a handheld power tool, the method comprising:

generating, via a controller associated with a measuring circuit, at least one control signal for the inverter from a predefined setpoint value and a measured value detected by the measuring circuit, wherein the handheld power tool includes at least one drive unit, which includes at least one oscillating excitation actuator for an oscillating drive of an associated insertion tool, an electronics unit for providing a controlled energy supply of the drive unit, the electronics unit including at least one inverter, one transformer, and the measuring circuit, the inverter being configured to generate a primary-side transformer voltage and a primary-side transformer current of the transformer, the transformer being configured to transform the primary-side transformer voltage and the primary-side transformer current into an application-specific supply voltage and a supply current for the drive unit, and the controller associated with the measuring circuit; and performing a primary-side measurement of the transformer voltage and the transformer current of the transformer, wherein the measuring circuit is situated between the inverter and the transformer.

* * * * *